United States Patent [19]
Ahmed et al.

[11] Patent Number: 6,073,266
[45] Date of Patent: *Jun. 6, 2000

[54] CEBUS DATA LINK LAYER PROXY

[75] Inventors: Zaheer Ahmed, San Jose; Sin-Min Fong, Palo Alto; Rajesh Kumar, Fremont; Mohamed Mostafa, Menlo Park, all of Calif.

[73] Assignee: Ericsson, Inc., Menlo Park, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/843,461

[22] Filed: Apr. 16, 1997

[51] Int. Cl.$^7$ ...................................................... H04L 1/18
[52] U.S. Cl. ............................................................ 714/749
[58] Field of Search ............................... 371/33; 370/438, 370/439, 395, 466, 465, 389; 714/748, 749

[56] References Cited

U.S. PATENT DOCUMENTS

| | | | |
|---|---|---|---|
| 5,268,666 | 12/1993 | Michel et al. | 340/310.06 |
| 5,471,190 | 11/1995 | Zimmermann | 340/310.01 |
| 5,485,630 | 1/1996 | Lee et al. | 455/4.1 |
| 5,495,239 | 2/1996 | Ouellette | 340/870.02 |
| 5,500,794 | 3/1996 | Fujita et al. | 364/188 |
| 5,544,036 | 8/1996 | Brown Jr. et al. | 364/145 |
| 5,570,085 | 10/1996 | Bertsch | 340/827.07 |
| 5,572,438 | 11/1996 | Ehlers et al. | 364/528.3 |
| 5,805,591 | 9/1998 | Naboulsi et al. | 370/395 |
| 5,809,076 | 9/1998 | Hofmann | 375/257 |
| 5,859,848 | 1/1999 | Miura et al. | 370/395 |

FOREIGN PATENT DOCUMENTS

| | | |
|---|---|---|
| Wo 97 09800 | 3/1997 | Australia . |
| 2080052 | 6/1993 | Canada . |
| 0549128 A2 | 6/1993 | European Pat. Off. . |
| 0658026 A2 | 6/1995 | European Pat. Off. ........ H04L 12/46 |
| 6-86362 | 3/1994 | Japan . |

OTHER PUBLICATIONS

Hargaden P J et al: "Functions and Operations of Cebus Routers" IEEE Transactions on Consumer Electronics, vol. 37, No. 2, May 1, 1991, pp. 135–143, XP000234470.

Christos Douligeris et al., Communications and Control For a Home Automation System, IEEE 1991, pp. 171 to 175, Mar. 1991.

Joseph C. Kelly et al., A Residential Energy Management Test Using CEBus, IEEE 1991, pp. 921–926, Jul. 13, 1992.

*Primary Examiner*—Hoa T. Nguyen
*Assistant Examiner*—Shelly A Chase
*Attorney, Agent, or Firm*—Lyon & Lyon LLP

[57] ABSTRACT

A communication protocol proxy enables a CEBus network to be mapped across a non-CEBus network, thereby allowing a remotely located node (e.g., a controller) to communicate via a non-CEBus network with electronic devices connected to the CEBus network, while still conforming with the EIA/IS-60 protocol requirements. In a preferred embodiment, a proxy node is provided on a CEBus network, wherein the proxy node is also connected to a non-CEBus network, (e.g., a wide area network ("WAN")), such that a remotely located controller on the non-CEBus network may communicate with a device on the CEBus network by transmitting messages to the proxy node over the non-CEBus network. The proxy node then forwards the message to the respective CEBus device over the CEBus network. If the message requires a CEBus Ack message response, the CEBus device transmits a CEBus Ack message to the proxy node, so that it is received within the time interval specified by the CEBus standard. On receiving the CEBus Ack message, the proxy node transmits a non-CEBus standard acknowledge message to the controller, which can be received over an extended time interval. If the message does not require a CEBus Ack message response, the proxy node still transmits a non-CEBus standard acknowledge message to the controller in order to verify receipt of the message.

12 Claims, 4 Drawing Sheets ical networks 130 each connect various respective
CEBUS DATA LINK LAYER PROXY

FIELD OF THE INVENTION

The present invention pertains to the field of data communications and, more particularly, to methods and apparatus for mapping a CEBus network across a non-CEBus network, while maintaining EIA/IS-60 Data Link Protocol requirements.

BACKGROUND OF THE INVENTION

In recent years, electronic devices have been developed with the ability to receive and communicate control and status information to other electronic devices, and to various controller devices. For example, electric meters in residential homes may now be commanded from a controller device to transmit the electric usage status of the home to the controller device. In another example, a controller device may command an air conditioner in a home to power on, or off, in an attempt to balance the power load in a residential subdivision.

CEBus ("Consumer Electronics Bus") is a communications standard that was developed by the Electronics Industry Association's ("EIA") Consumer Group for use by such residential electrical (i.e., "consumer") devices. This standard specifies how devices are to send and receive information, the media available to them for communication purposes, and the format for the information the devices communicate to each other. In particular, the CEBus standard permits devices made by various manufacturers to be able to communicate with each other in a residential setting. The standard is documented in the CEBus EIA/IS-60 specification, which is fully incorporated herein by reference.

Thus far, networks based on the CEBus standard have been geared for "local access" control and surveillance. In particular, a specified subset of messages transmitted within a CEBus network by a controller device, or any other CEBus network device, require a CEBus "Ack" (i.e, acknowledge) message to be transmitted in response, and to be received by the device transmitting the original message within 600 $\mu$secs of the transmission of that original message. Due to this stringent timing requirement, controller devices for CEBus networks have necessarily been required to be located locally, i.e., in the general vicinity of the controlled device(s), which has thus far prevented the effective extension of the CEBus standard protocol to allow for "remote access" control. The situation is further complicated if a remote controller device for exercising control of one or more devices on a CEBus network itself communicates via a non-CEBus network.

It has been proposed that remote access to CEBus automatic networks can be implemented with the use of modem links over conventional copper wire pairs. However, field trials have shown this approach to be both costly and unreliable.

Thus, it would be advantageous to provide apparatus and methods for reliable and cost efficient remote access to a CEBus network. It would be a further advantage to provide apparatus and methods for reliably mapping a CEBus network on a non-CEBus network, while still maintaining the EIA/IS-60 timing requirements.

SUMMARY OF THE INVENTION

The present invention provides apparatus and methods for employing a communication protocol proxy that enables a CEBus network to be mapped across a non-CEBus network, thereby allowing a remotely located node (e.g., a controller) to communicate via a non-CEBus network with electronic devices connected to the CEBus network, while still conforming with the EIA/IS-60 protocol requirements.

In a preferred embodiment, a proxy node is provided on a CEBus network, wherein the proxy node is also connected to a non-CEBus network (e.g., a wide area network ("WAN")). A remotely located controller on the non-CEBus network may communicate with a device on the CEBus network by transmitting messages to the proxy node over the non-CEBus network. The proxy node then forwards the message to the respective CEBus device over the CEBus network. If the message requires a CEBus Ack message response, the CEBus device transmits a CEBus Ack message to the proxy node, so that it is received within the time interval specified by the CEBus standard. On receiving the CEBus Ack message, the proxy node transmits a non-CEBus standard acknowledge message to the controller, which can be received over an extended time interval. If the message does not require a CEBus Ack message response, the proxy node still transmits a non-CEBus standard acknowledge message to the controller in order to verify receipt of the message.

For message transmissions from the CEBus device to the controller, the CEBus device transmits a message to the proxy node on the CEBus network. The proxy node then transmits the message to the controller, over the non-CEBus network. If the message requires a CEBus Ack message response, the proxy node itself transmits the CEBus Ack message to the CEBus device. Whether or not the message requires a CEBus Ack message response, the controller, upon receiving the message from the proxy node, transmits a non-CEBus standard acknowledge message to the proxy node.

Thus, a general object of the invention is to support communications between a remote access controller on a non-CEBus network and one or more devices on a CEBus network. Other and further objects, features, aspects and advantages of the present invention will become better understood with the following detailed description of the accompanying drawings.

BRIEF DESCRIPTION OF THE DRAWINGS

The drawings illustrate both the design and utility of preferred embodiments of the present invention, in which.

DETAILED DESCRIPTION OF THE DRAWINGS

Figure 1:
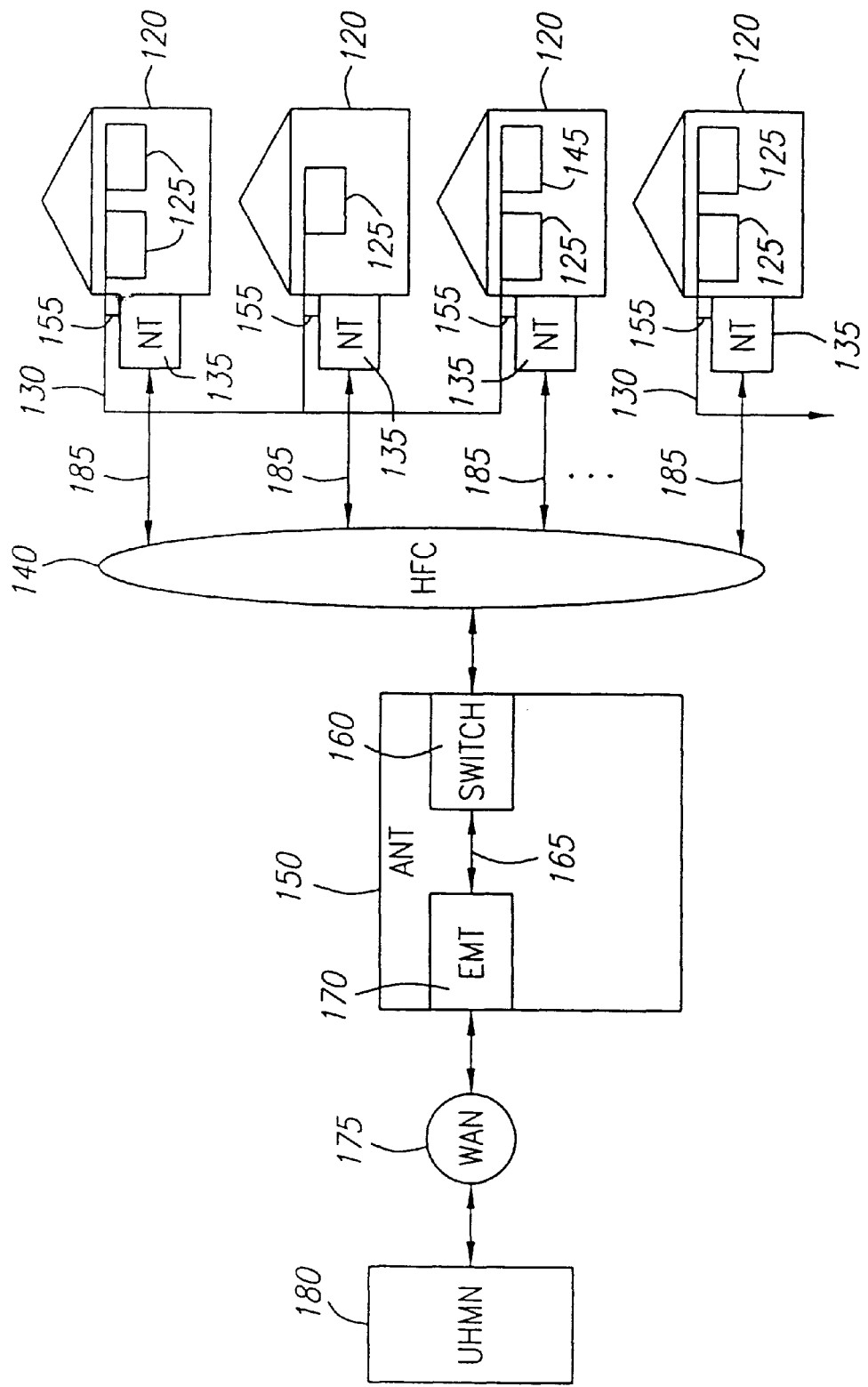
FIG. 1 is a diagram illustrating the mapping of a plurality of CEBus residential networks across a non-CEBus wide area network ("WAN"), via a plurality of respective proxy nodes.

Referring to FIG. 1, a plurality of CEBus standard residential networks 130 each connect various respective devices located in one or more respective residences 120. In particular, a residential home 120 may contain one or more utility-managed settable nodes ("UMSN"s) 125 managed by a utility company in energy-management applications, including, but not limited to, gas and electrical appliances. More particularly, a UMSN 125 is a "smart" consumer device, also referred to as a "CEBus device" or a "CEBus node," that communicates with other similar devices via CEBus standard-defined messages and protocols. A plurality of UMSNs 125 that can communicate either directly across a shared physical medium, or indirectly via a plurality of physical media, collectively comprise a respective CEBus network 130. A CEBus network 130 may contain CEBus devices 125 from a plurality of residential homes 120. The same CEBus network may also contain other, non-UMSN CEBus devices 145.

Each CEBus network 130 has a physical layer, which consists of the information signal transmitted within the respective CEBus network 130. Each CEBus network 130 also has a data link layer ("DLL"), which provides the means for establishing and maintaining individual data links on the respective CEBus network 130. The CEBus network 130 DLL also provides for the transfer of information over a physical link, or links, connecting the respective CEBus nodes 125, 135 and 145, including the requisite synchronization, error control and flow control.

Each residential home 120 containing one or more UMSNs 125 is also provided with a network terminal ("NT") device 135 located proximate to, or placed in, the respective residential home 120, wherein the NT 135 is linked to the respective CEBus network 130 connecting the UMSNs 125 of that home 120. In particular, the NTs 135 are UMSNs, and are also special application CEBus devices which enable the CEBus networks 130 to be mapped to external, non-CEBus networks. In a presently preferred embodiment, each NT 135 also delivers analog distributive services and digital interactive services to the respective residences 120, which are received over a two-way hybrid fiber/coax distribution ("HFC") network 140, and are provided by the NT 135 over a mix of service interfaces (not shown) to its respective residence 120, i.e., for various computing, telecommunications and entertainment equipment (also not shown).

An exemplary preferred NT (i.e., "network interface") device is shown and described in U.S. patent application Ser. No. 08/608,436, filed Feb. 28, 1996, entitled, "Subscriber Network Interface And Method," which is also fully incorporated herein by reference. The disclosed network interface supports the two-way transport of multiple communication services, including at least RF analog and RF carrier modulated ATM cells, over a single coaxial distribution cable. ATM cell-mux circuitry in the network interface provides for de-multiplexing and routing of incoming ATM cells, and for collecting and multiplexing of outgoing ATM cells, respectively, wherein the incoming and outgoing ATM cells are routed to and from a plurality of "ATM" subscriber service modules within the subscriber interface.

More particularly, the respective subscriber service modules each support individual services such as telecommunications, set-top telemetry, or baseband digital data services, such as, e.g., ethernets or a dedicated PC modem data line. Each service module "disassembles" the respective incoming cells routed to it by the ATM cell-mux, converting (or "adapting") the data contained therein into an appropriate service protocol for delivery through a subscriber-side I/O port associated with the respective service module. The protocol conversion may include, for example, circuit emulation for providing a synchronous digital data stream, depending on the respective service. Conversely, information in upstream signals received through a subscriber-side I/O port is assembled into sequential cells by the respective service module and delivered to the ATM cell-mux. In this manner, the ATM transmission of combined services over the network side is advantageously transparent at the subscriber-side I/O ports of the subscriber interface.

Although that disclosure makes no specific reference to having a CEBus interface as one of the implemented subscriber service modules, or otherwise being a utility managed node, it will be apparent to those skilled in the art from both that disclosure and the present disclosure that the described network interface may be adapted for these purposes, as well.

As will be apparent to those skilled in the art, the hybrid fiber coax distribution network 140 may take several alternate physical forms. By way of example, "downstream" ATM traffic transmitted by the switch 160 and intended for one or more NTs 135 may initially be multiplexed for transport over a shared high speed optical fiber (not shown), then de-multiplexed for local distribution over a shared coaxial cable (also not shown). In alternate preferred embodiments, a pure optical or coaxial network may be equally employed.

By way of specific examples of ATM-based broadband access distribution networks, a preferred system architecture and data transmission protocol for an ATM-based point-to-multipoint optical network is disclosed and described in U.S. patent application Ser. No. 08/826,633, filed Apr. 3, 1997, entitled "Data Transmission Over a Point-to-Multipoint Optical Network." Likewise, a preferred system architecture and data transmission protocol for an ATM-based point-to-multipoint broadband access network employing a shared coaxial medium is disclosed and described in U.S. patent application Ser. No. 08/772,088, filed Dec. 19, 1996, entitled "Network Architecture for Broadband Data Communication Over a Shared Medium." Both of these applications are fully incorporated herein by reference.

Each NT 135 has a CEBus network interface 155 for the transmission and receipt of messages between the NT 135 and one or more UMSNs 125 and/or other CEBus devices 145 on the CEBus network 130. Each NT 135 also has a non-CEBus network interface 185, for the transmission and receipt of data over the HFC 140. In particular, each NT 135 transmits and receives data over the HFC 140 to and from a packet switch 160, e.g., an asynchronous transfer mode ("ATM") switch, located at an access network termination ("ANT") facility 150. The packet switch 160 also communicates via a data link 165 with an energy management terminal ("EMT") 170 located at the ANT 150, which is configured to send and receive messages to and from a remotely located utility host master node ("UHMN") 180 via a wide area network ("WAN") 175. In a presently preferred embodiment, the UHMN 180 is a central management entity, responsible for monitoring and controlling UMSNs 125 located in several residences 120; i.e., via the plurality of CEBus networks 130.

In accordance with the EIA/IS-60 standard, respective UMSNs 125 communicate via CEBus standard packets, or messages, also called "link protocol data units" ("LPDU"s). In particular, an LPDU is a packet of information of a maximum length of 41 bytes (also referred to as "octets"), which includes a header field, a destination device address field, a destination house code field, a source device address field, a source house code field, and a "common application language" ("CAL") statement field. The CAL statement field of an LPDU comprises the command or status information transmitted via the LPDU.

An LPDU may require a respective CEBus Ack (acknowledge) message to be transmitted by the receiving device back to the device which transmitted the LPDU. The CEBus Ack message format is defined in the EIA/IS-60 specification. In particular, the CEBus EIA/IS-60 protocol requires that the CEBus Ack message be received by the originally transmitting device within 600 $\mu$secs of the transmission of the LPDU requiring the response.

In accordance with a general aspect of the invention, the UHMN 180 may remotely control one or more UMSNs 125 by transmitting and receiving LPDUs over the respective WAN 175 and HFC 140, to the respective NTs 135, which act as proxy nodes for the UMSNs 125. More particularly, an LPDU transmitted from the UHMN 180, and addressed for a specified UMSN 125, is received by the respective NT 135 of the residence 120 containing that UMSN 125. The NT 135 then transmits the LPDU to the identified UMSN 125. If the LPDU requires a CEBus Ack message response, the recipient UMSN 125 transmits a CEBus Ack message back to the respective NT 135 so that the CEBus Ack message is received by the NT 135 within the 600 $\mu$sec time interval specified by the EIA/IS-60 standard; i.e., based on when the LPDU was transmitted by the NT 135. Upon receiving the CEBus Ack message from the UMSN 125, the NT 135 transmits a non-CEBus standard NT DLL Ack message to the UHMN 180 over the non-CEBus network (i.e., the HFC network 140/WAN 175). If, however, the LPDU does not require a CEBus Ack message response, the respective NT 135 still transmits a non-CEBus standard NT DLL Ack message to the UHMN 180, but does so immediately upon receipt of the LPDU from the UHMN 180.

If an LPDU for a UMSN 125 requires a CEBus Ack message response, but the respective NT 135 does not receive the expected CEBus Ack message from the UMSN 125 within 600 $\mu$secs of transmitting the LPDU to the UMSN 125, the NT 135 initiates a retry sequence, whereby it re-transmits the LPDU to the UMSN 125. The NT 135 repeats this retry sequence a (CEBus standard) maximum of N×8 times, where N is in the range 0–15, or until the UMSN 125 responds to an LPDU re-transmission with a timely CEBus Ack message. In a presently preferred embodiment, N is set to a value of 3. If the respective NT 135 does receive a CEBus Ack message from the UMSN 125 in response to a re-transmission of the LPDU to the UMSN 125, it transmits a non-CEBus standard NT DLL Ack message back to the UHMN 180. If the respective NT 135 does not receive a CEBus Ack message from the recipient UMSN 125 in response to either the original or any of the re-transmissions of the LPDU, it transmits a non-CEBus standard NT DLL Nack message to the UHMN 180. A preferred NT DLL Ack/Nack message format is described in greater detail below, in conjunction with FIG. 4.

Notably, an LPDU may be transmitted from the UHMN 180 for more than one UMSN 125. In this case, if the LPDU requires a CEBus Ack message response, each recipient UMSN 125 for whom the LPDU is sent transmits a CEBus Ack message to its respective NT 135. On receiving a first UMSN 125 CEBus Ack message, the respective NT 135 transmits an NT DLL Ack message to the UHMN 180 and discards any further received CEBus Ack messages corresponding to the respective LPDU. If the UHMN 180 is concerned with a response being received from a particular UMSN 125, the UHMN 180 should send an LPDU requiring a CEBus Ack message response addressed to that UMSN 125.

The UHMN 180 may also transmit an LPDU addressed to a specified NT 135 itself. The UHMN 180 may also set a specified field in the LPDU to indicate that the NT 135 should respond to the LPDU with a CEBus Ack message. In this case, the recipient NT 135 first responds to receipt of the LPDU message by transmitting an NT DLL Ack message to the UHMN 180. The NT 135 then transmits a CEBus Ack message to the UHMN 180. If an NT 135 receives an LPDU addressed for it from the UHMN 180 and the LPDU does not indicate that the NT 135 should transmit a CEBus Ack message response, the NT 135 still transmits an NT DLL Ack message to the UHMN 180 upon receipt of the LPDU.

In accordance with a general aspect of the present invention, the UMSNs 125 may also generate messages to be transmitted to the UHMN 180. More particularly, an LPDU transmitted from a UMSN 125 for the UHMN 180 is received by the respective NT 135 of the residence 120 containing the UMSN 125. The NT 135 then transmits the LPDU to the UHMN 180 over the respective HFC 140 and WAN 175. If the LPDU requires a CEBus Ack message response, the recipient NT 135 transmits a CEBus Ack message back to the respective UMSN 125, so that the CEBus Ack message is received by the UMSN 125 within the 600 $\mu$sec time interval specified by the EIA/IS-60 standard; i.e., based on when the LPDU was transmitted by the UMSN 125.

If an LPDU for the UHMN 180 requires a CEBus Ack message response, but the respective UMSN 125 does not receive the expected CEBus Ack message from the respective NT 135 within 600 $\mu$secs of transmitting the LPDU, the UMSN 125 initiates a retry sequence, whereby it re-transmits the LPDU to the UHMN 180. The UMSN 125 repeats this retry sequence a (CEBus standard) maximum of N×8 times, where N is in the range 0–15, or until the respective NT 135 responds to an LPDU re-transmission with a timely CEBus Ack message. In a presently preferred embodiment, N is set to a value of 3.

Whether or not the LPDU requires a CEBus Ack message response, the UHMN 180, upon receiving the LPDU from the NT 135, transmits a non-CEBus standard NT DLL Ack message to the NT 135.

Figure 2:
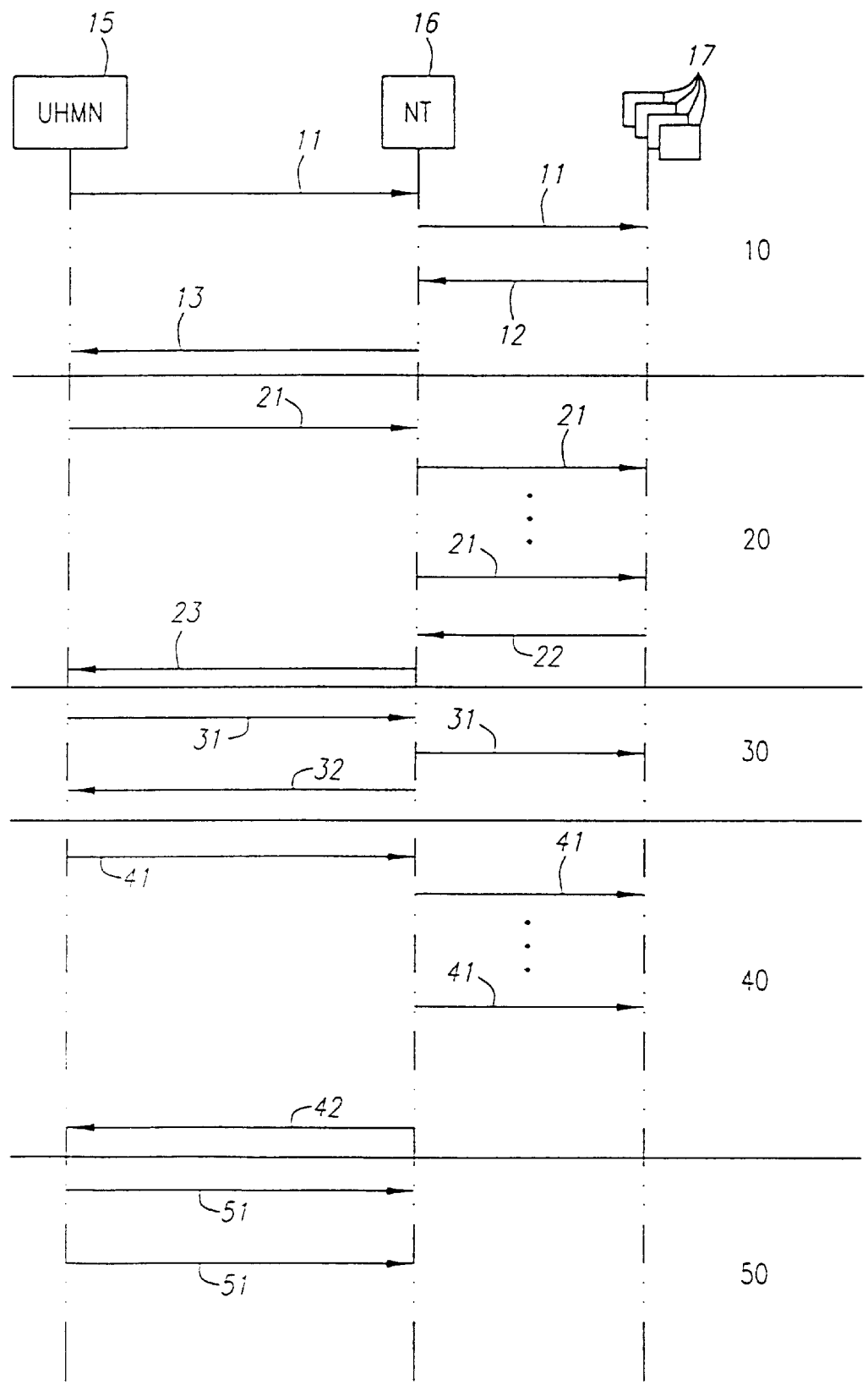
FIG. 2 is a diagram of preferred message transmission protocol sequences for link protocol data unit ("LPDU") transmissions from a remotely located utility host master node ("UHMN") on a non-CEBus network to a utility-managed settable node ("UMSN") on a CEBus network.

FIG. 2 depicts preferred message transmission protocol sequences for LPDUs transmitted from a remotely located UHMN 15 over a non-CEBus network, via an NT proxy node 16, to a respective UMSN 17 on a CEBus network.

In a first exemplary scenario 10, an LPDU 11 of the type requiring a CEBus Ack message response is transmitted from the UHMN 15 and is received by the NT 16. The NT 16 then transmits the LPDU 11 to the specified UMSN 17. The UMSN 17 transmits a responsive CEBus Ack message 12 to the NT 16, which is received by the NT 16 within 600 $\mu$secs of when it transmitted the LPDU 11 to the UMSN 17. Upon receiving the CEBus Ack message 12, the NT 16 transmits an NT DLL Ack message 13 to the UHMN 15, which is preferably received by the UHMN 15 within 5 seconds of when it transmitted the LPDU 11 to the UHMN 17. The message transmission protocol sequence for the respective LPDU 11 is now completed.

In a second exemplary scenario 20, an LPDU 21 of the type requiring a CEBus Ack message response is transmitted from the UHMN 15 and is received by the NT 16. The NT 16 then transmits the LPDU 21 to the specified UMSN 17. In scenario 20, however, the NT 16 does not receive a CEBus Ack message response from the UMSN 17 within 600 $\mu$secs of when it transmits the LPDU 21. Thus, the NT 16 executes one or more retry attempts, i.e., with each retry attempt consisting of re-transmitting the LPDU 21 to the UMSN 17. The NT 16 remains in a "retry CEBus transmission state" until it finally receives the CEBus Ack message 22 within 600 μsecs of re-transmitting the LPDU 21 to the UMSN 17. Only then does the NT 16 transmit an NT DLL Ack message 23 to the UHMN 15, which should still receive the NT DLL Ack message 23 within 5 seconds of originally transmitting the LPDU 21. The message transmission protocol sequence for the respective LPDU 21 is now completed.

In a third exemplary scenario 30, an LPDU 31 of the type which does not require a CEBus Ack message response is transmitted from the UHMN 15 and is received by the NT 16. The NT 16 then transmits the LPDU 31 to the specified UMSN 17. Upon receipt of the LPDU 31, the NT 16 also transmits an NT DLL Ack message 32 back to the UHMN 15, which receives the NT DLL Ack message 32 within 5 seconds of transmitting the LPDU 31. The message transmission protocol sequence for the respective LPDU 31 is now completed.

In a fourth exemplary scenario 40, an LPDU 41 of the type requiring a CEBus Ack message response is transmitted from the UHMN 15 and is received by the NT 16. The NT 16 then transmits the LPDU 41 to the specified UMSN 17. In scenario 40, however, the NT 16 does not receive a CEBus Ack message from the UMSN 17 within 600 μsecs of transmitting the LPDU 41 to the UMSN 17. The NT 16 then re-transmits the LPDU 41 to the UMSN 17 (up to) twenty-four times, but still does not receive a CEBus Ack message from the UMSN 17 within 600 μsecs of re-transmitting the LPDU 41. After the last (e.g., "twenty-fourth") re-transmission of the LPDU 41, the NT 16 transmits an NT DLL Nack message 42 to the UHMN 15, which is received by the UHMN 15 within 5 seconds of when it originally transmitted the LPDU 41. The message transmission protocol for the respective LPDU 41 is now completed. In an alternate embodiment, the UHMN 15 may continue to re-transmit the LPDU 41 to the NT 16, based on the message type, message priority, and/or system requirements, attempting to have the LPDU 41 be successfully received and responded to by the UMSN 17.

In a fifth exemplary scenario 50, an LPDU 51 of the type requiring a CEBus Ack message response is transmitted from the UHMN 15 and is received by the NT 16. In scenario 50, the UHMN 15 does not receive an NT DLL Ack message or an NT DLL Nack message from the NT 16 within 5 seconds of transmitting the LPDU 51. The UHMN 15 then re-transmits the LPDU 51 one more time, but still does not receive an NT DLL Ack message or an NT DLL Nack message from the NT 16 within 5 seconds. The message transmission protocol sequence for the respective LPDU 51 is now completed. In an alternate embodiment, the UHMN 15 may continue to re-transmit the LPDU 51 to the NT 16, based on the message type, message priority, and/or system requirements, attempting to have the LPDU 51 be successfully received by the UMSN 17.

Figure 3:
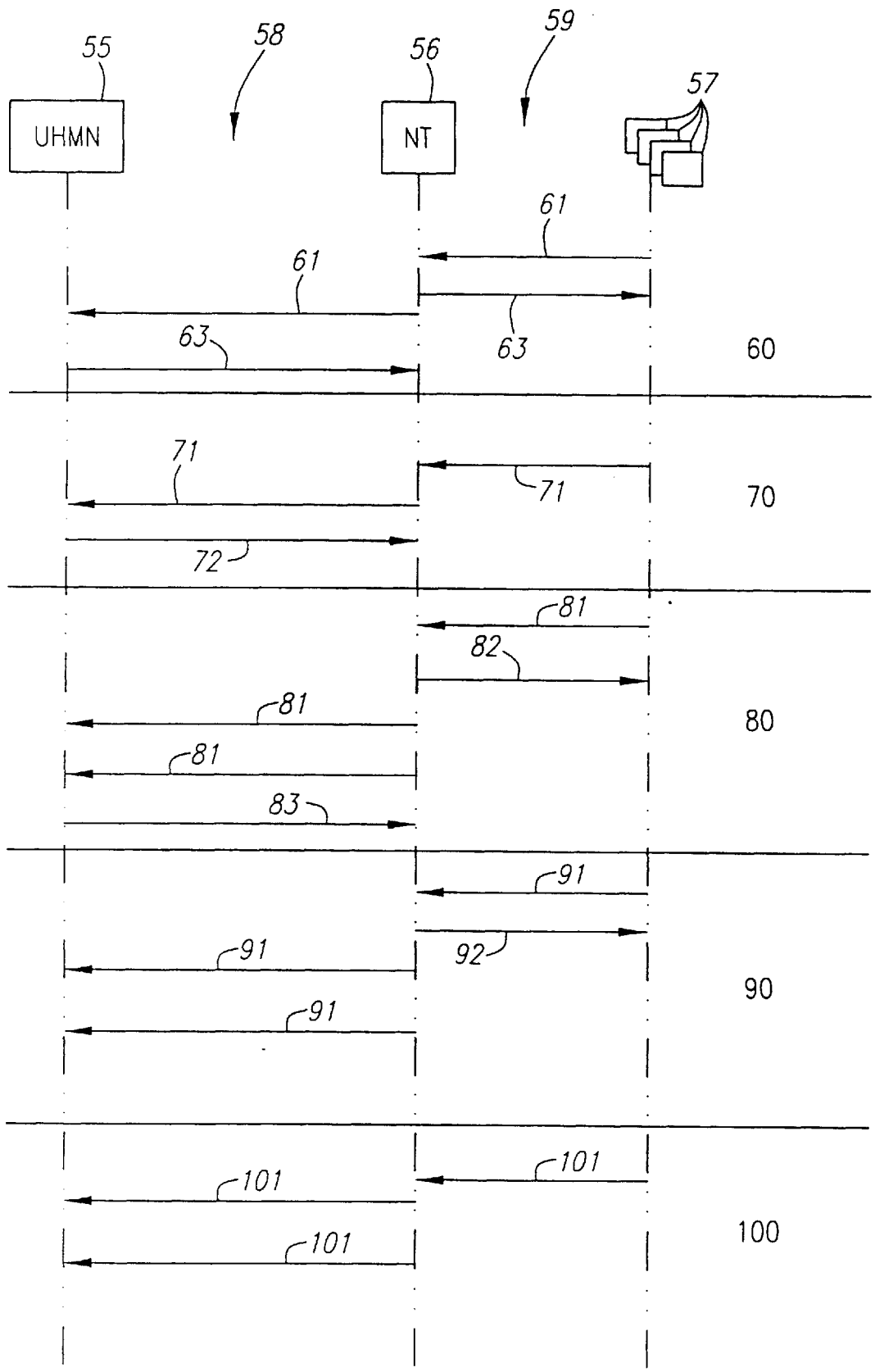
FIG. 3 is a diagram of preferred message transmission protocol sequences for LPDU transmissions from a UMSN on a CEBus network to a UHMN on a non-CEBus network.

FIG. 3 depicts preferred message transmission protocol sequences for LPDUs transmitted from a UMSN 57 on a CEBus network 59 to a remote UHMN 55, located on a non-CEBus network 58, via an NT proxy node 56.

In a first exemplary scenario 60, an LPDU 61 of the type requiring a CEBus Ack message response is transmitted by the UMSN 57 and received by the NT 56. The NT 56 then transmits the LPDU 61 to the UHMN 55. Upon receiving the LPDU 61, the NT 56 also transmits a responsive CEBus Ack message 62 to the UMSN 57, which is received by the UMSN 57 within 600 μsecs of when it transmitted the LPDU 61. Upon receiving the LPDU 61, the UHMN 55 transmits an NT DLL Ack message 63 to the NT 56, which the NT 56 receives within five seconds of transmitting the LPDU 61. The message transmission protocol sequence for the respective LPDU 61 is now completed.

In a second exemplary scenario 70, an LPDU 71 of the type that does not require a CEBus Ack message response is transmitted by the UMSN 57 and received by the NT 56. The NT 56 then transmits the LPDU 71 to the UHMN 55. Upon receiving the LPDU 71, the UHMN 55 transmits an NT DLL Ack message 72 to the NT 56, which the NT 56 receives within five seconds of transmitting the LPDU 71. The message transmission protocol sequence for the respective LPDU 71 is now completed.

In a third exemplary scenario 80, an LPDU 81 of the type requiring a CEBus Ack message response is transmitted by the UMSN 57 and received by the NT 56. The NT 56 then transmits the LPDU 81 to the UHMN 55. The NT 56 also transmits a responsive CEBus Ack message 82 back to the UMSN 57 upon receiving the LPDU 81, which the UMSN 57 receives within 600 μsecs of transmitting the LPDU 81. In scenario 80, however, the NT 56 does not receive an NT DLL Ack message from the UHMN 55 within 5 seconds of transmitting the LPDU 81 to the UHMN 55. The NT 56 then re-transmits the LPDU 81 to the UHMN 55, and receives an NT DLL Ack message 83 from the UHMN 55 within five seconds of its second transmission of the LPDU 81. The message transmission protocol sequence for the respective LPDU 81 is now completed.

In an fourth exemplary scenario 90, an LPDU 91 of the type requiring a CEBus Ack message response is transmitted by the UMSN 57 and is received by the NT 56. The NT 56 then transmits the LPDU 91 to the UHMN 55. The NT 56 also transmits a responsive CEBus Ack message 92 back to the UMSN 57 upon receiving the LPDU 91, which the UMSN 57 receives within 600 μsec of transmitting the LPDU 91. In scenario 90, however, the NT 56 does not receive an NT DLL Ack message from the UHMN 55 within five seconds of transmitting the LPDU 91 to the UHMN 55. The NT 56 then re-transmits the LPDU 91 to the UHMN 55, but still does not receive an NT DLL Ack message from the UHMN 55 within five seconds. The message transmission protocol sequence for the respective LPDU 91 is now completed. In an alternate embodiment, the NT 56 may continue to re-transmit the LPDU 91 to the UHMN 55, based on the message type, message priority, and/or system requirements, attempting to have the LPDU 91 be successfully received and responded to by the UHMN 55.

In a fifth exemplary scenario 100, an LPDU 101 of the type that does not require a CEBus Ack message response is transmitted by the UMSN 57 and is received by the NT 56. The NT 56 then transmits the LPDU 101 to the UHMN 55. In scenario 100, however, the NT 56 does not receive an NT DLL Ack message from the UHMN 55 within five seconds of transmitting the LPDU 101 to the UHMN 55. The NT 56 then re-transmits the LPDU 101 to the UHMN 55, but still does not receive an NT DLL Ack message from the UHMN 55 within five seconds. The message transmission protocol sequence for the respective LPDU 101 is now completed. In an alternate embodiment, the NT 56 may continue to re-transmit the LPDU 101 to the UHMN 55, based on the message type, message priority, and/or system requirements, attempting to have the LPDU 101 be successfully received and responded to by the UHMN 55.

In a presently preferred embodiment, a UHMN, each NT, and each UMSN has a processor and associated memory (not shown), for executing the instructions necessary to perform the above-described protocol and exemplary protocol sequences.

Figure 4:
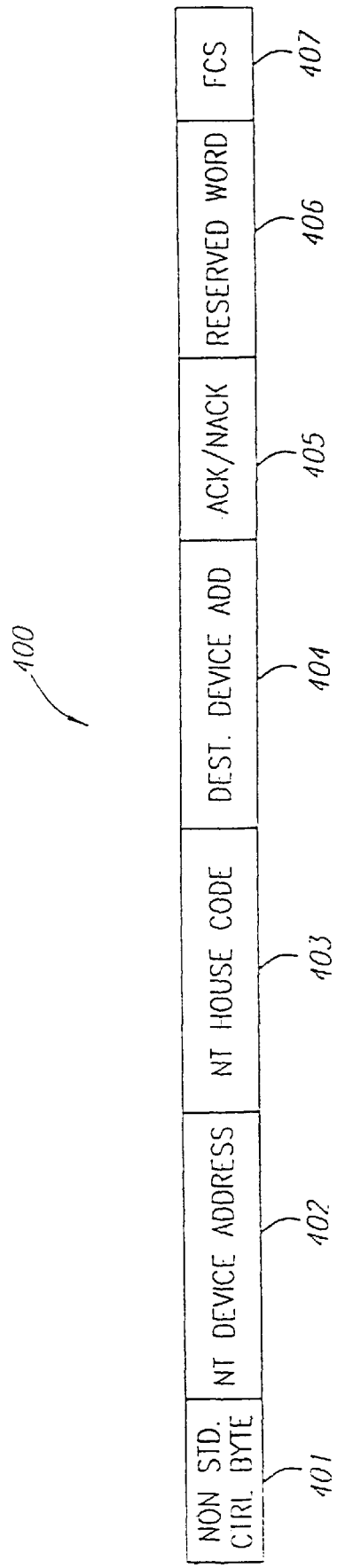
FIG. 4 is a diagram of a preferred network termination data link layer acknowledge/negative acknowledge ("NT DLL Ack/Nack") message format.

FIG. 4 depicts a preferred format for a non-CEBus standard NT DLL Ack/Nack message 400 for use in a network configuration of FIG. 1. Each byte, or octet, of the NT DLL Ack/Nack message 400 is 8 bits. A first, and most significant, byte of the NT DLL Ack/Nack message consists of a control byte 401. In a presently preferred embodiment, the value of control byte 401 is set to 0xFF hex.

The next two bytes of the NT DLL Ack/Nack message 400 consist of an NT device address field 402. An NT device address is a unique address assigned to each NT 135. In particular, the NT device address field 402 of an NT DLL Ack/Nack message carries the address of the NT 135 to whom, or from whom, the NT DLL Ack/Nack message is transmitted.

The next two bytes of an NT DLL Ack/Nack message 400 consist of an NT "house code" field 403. Several CEBus nodes, including NTs 135, which are interconnected through the same physical medium, or even interconnected through multiple physical media, may comprise a group that is assigned a unique house code. In particular, the NT house code field 403 of an NT DLL Ack/Nack message 400 comprises a code assigned to a group in which the NT 135 receiving or transmitting the respective NT DLL Ack/Nack message 400 is a part of.

The next two bytes of an NT DLL Ack/Nack message 400 consist of a destination device address field 404. The destination device address field 404 is set to the address of a specified UMSN 125, (or more generically, a CEBus device) to which the original LPDU was transmitted, i.e., the original LPDU being the initiation of the message protocol sequence resulting in the respective NT DLL Ack/Nack message 400. If the original LPDU was transmitted to more than one CEBus device, the destination device address field 404 of the respective NT DLL Ack/Nack message 400 is set to a broadcast device address that the CEBus devices for whom the LPDU was transmitted share in common.

The next byte of the NT DLL Ack/Nack message 400 consists of an ack/nack code field 405, which is used to identify whether the message is an NT DLL "Ack" message or an NT DLL "Nack" message. In a presently preferred embodiment, the value of field 405 is set to 0x00 hex to indicate the message is an NT DLL Ack message, and to 0x01 hex to indicate the message is an NT DLL Nack message.

In a presently preferred embodiment, the next three bytes of an NT DLL Ack/Nack message 400 are a reserved field 406, the bits of this field 406 reserved for future use.

The final, and least significant byte of the NT DLL Ack/Nack message 400 consists of a Frame Check Sequence ("FCS") field 407. An FCS is an encoded value appended to each message to allow detection of transmission errors in the physical channel. In a presently preferred embodiment, the FCS field 407 carries an 8-bit checksum value.

While embodiments and applications of preferred apparatus and methods for employing a communication protocol proxy that enables a CEBus network to be mapped across a non-CEBus network have been shown and described, as would be apparent to those skilled in the art, many modifications and applications are possible without departing from the inventive concepts herein.

As a non-limiting example, a UHMN may be implemented as any device that is situated on a non-CEBus network. As a further non-limiting example, a non-CEBus network may also be a local area network ("LAN") or a point-to-point network. As a still further non-limiting example, a UMSN may be any CEBus device that a remote controller wishes to access.

Thus, the scope of the disclosed inventions is not to be restricted except in the spirit of the appended claims.

What is claimed:

1. A method for transmitting messages from a first node located on a non-CEBus network to a device located on a CEBus network, via a proxy node, wherein the messages are of a type requiring a standard CEBus acknowledge message response, the method comprising:

transmitting a message from the first node to the proxy node via ATM transmission;

converting the message from ATM format to CEBus format at the proxy node;

transmitting the message from the proxy node to the device over the CEBus network;

receiving a responsive CEBus acknowledge message from the device at the proxy node, the responsive CEBus acknowledge message transmitted over the CEBus network and received by the proxy node within a first specified time interval; and transmitting a non-CEBus acknowledge message from the proxy node to the first node via ATM transmission such that the first node receives the non-CEBus acknowledge message within a second specified time interval.

2. The method of claim 1, wherein if the CEBus acknowledge message is not received by the proxy node within the first specified time interval after sending the message from the proxy node to the device, the method further comprising:

periodically re-transmitting the message from the proxy node to the device until a responsive CEBus acknowledge message from the device is received by the proxy node, or until a selected number of re-transmissions have been made.

3. The method of claim 2, wherein if the proxy node does not receive a responsive CEBus acknowledge message within the first specified time interval after a selected number of re-transmissions of the message from the proxy node to the device, the method further comprising:

transmitting a non-standard negative acknowledge message from the proxy node to the first node over the non-CEBus network, such that the first node receives the non-standard negative acknowledge message within the second specified time interval.

4. The method of claim 1, wherein if no acknowledgement of the receipt of the message is received by the first node from the proxy node within the second specified time interval, the method further comprising:

re-transmitting the message from the first node to the proxy node over the non-CEBus network.

5. The method of claim 1, wherein the device is a utility managed settable node.

6. The method of claim 1, wherein the first node is a utility host master node.

7. The method of claim 1, wherein the first specified time interval is 600 usec.

8. A method for transmitting messages destined for a CEBus-compliant device from a first node located on a non-CEBus network to the CEBus-compliant device located on a CEBus network, via a proxy node, the method comprising:

transmitting a message from the first node to the proxy node over the non-CEBus network;

transmitting the message from the proxy node to the CEBus-compliant device over the CEBus network;

receiving a standard CEBus acknowledge message from the CEBus-compliant device at the proxy node in a first time interval from when the proxy node transmitted the message to the CEBus-compliant device if the message is of a type requiring a standard CEBus acknowledge message response; and transmitting a non-CEBus acknowledge message from the proxy node to the first node within a second time interval if the proxy node receives the standard CEBus acknowledge message within the first time interval or the message is not of a type requiring a standard CEBus acknowledge message response.

9. The method of claim 8 further comprising transmitting a non-CEBus negative acknowledge message from the proxy node to the first node if the message is of a type requiring a standard CEBus acknowledge message response and the proxy node does not receive a standard CEBus acknowledge message after a specified number of retries of transmitting the message to the CEBus-compliant device and waiting the first time interval to receive the standard CEBus acknowledge message from the CEBus-compliant device.

10. The method of claim 8 in which the second time interval is five seconds.

11. The method of claim 10 in which the first time interval is 600 μseconds.

12. A method for transmitting messages destined for a device located on a CEBus network from a first node located on a non-CEBus network, via a proxy node, the method comprising:

transmitting a message from the first node to the proxy node over the non-CEBus network;

transmitting the message from the proxy node to the device over the CEBus network;

waiting to receive a standard CEBus acknowledge message from the device at the proxy node for a first time interval from when the proxy node transmitted the message to the device if the message is of a type requiring a standard CEBus acknowledge message response;

transmitting a non-CEBus acknowledge message from the proxy node to the first node within a second time interval if the proxy node receives the standard CEBus acknowledge message within the first time interval or the message is not of a type requiring a standard CEBus acknowledge message response; and transmitting a non-CEBus negative acknowledge message from the proxy node to the first node within the second time interval if the proxy node does not receive a standard CEBus acknowledge message from the device.

* * * * *